United States Patent
Eylon (10) Patent No.: US 10,848,452 B2
(45) Date of Patent: Nov. 24, 2020

(54) MAILING LIST MANIPULATIONS (71) Applicant: Red Hat Israel, Ltd., Raanana (IL)

(72) Inventor: Yaniv Eylon, Kibbutz Hasolelim (IL)

(73) Assignee: Red Hat Israel, Ltd., Raanana (IL)

( * ) Notice: Subject to any disclaimer, the term of this patent is extended or adjusted under 35 U.S.C. 154(b) by 10 days.

(21) Appl. No.: 14/190,260

(22) Filed: Feb. 26, 2014

(65) Prior Publication Data

US 2015/0244667 A1 Aug. 27, 2015

(51) Int. Cl.
*H04L 12/58* (2006.01)

(52) U.S. Cl.
CPC ................... *H04L 51/28* (2013.01)

(58) Field of Classification Search
CPC ............... H04L 51/28; H04L 61/30
See application file for complete search history.

(56) References Cited

U.S. PATENT DOCUMENTS

| | | | |
|---|---|---|---|
| 7,050,185 B1 * | 5/2006 | Sawada | H04L 51/24 358/1.15 |
| 8,271,589 B2 | 9/2012 | Phillips et al. | |
| 2005/0010645 A1 * | 1/2005 | Arshi | G06Q 10/107 709/207 |
| 2005/0198173 A1 * | 9/2005 | Evans | H04L 51/12 709/206 |
| 2006/0036699 A1 * | 2/2006 | Bauchot | G06Q 10/107 709/206 |
| 2006/0143276 A1 * | 6/2006 | Phillips | H04L 51/28 709/206 |
| 2009/0172096 A1 * | 7/2009 | Muller | G06Q 10/107 709/204 |
| 2011/0099239 A1 * | 4/2011 | Buchheit | G06Q 10/107 709/206 |

* cited by examiner

*Primary Examiner* — Jason D Recek
*Assistant Examiner* — Lesa M Kennedy
(74) *Attorney, Agent, or Firm* — Womble Bond Dickinson (US) LLP (57) ABSTRACT

Implementations for mailing list manipulations are disclosed. In one example, the method includes receiving a first distribution list comprising a first plurality of electronic messaging system addresses, receiving a first identifier referencing a first electronic messaging system address, and causing a message to be sent to one or more electronic messaging system address in the first distribution list except to the first electronic messaging system address.

13 Claims, 6 Drawing Sheets

Receive an electronic message system distribution list displayed in a header field of an electronic message that is being composed  310

Receive an identifier of an electronic message system address to be excluded from the electronic message system distribution list. The electronic message system address to be excluded can be displayed following the electronic message system distribution list in the header field of the electronic message that is being composed. The electronic message system address to be excluded can be indicated with the use of a special character such as {  320

Compare the electronic message system address to be excluded with each electronic message system address in the electronic message system distribution list.  330

Does the electronic message system distribution list include the electronic message system address to be excluded? 340

NO → Cause the electronic message to be sent to each address in the distribution list  350

YES ↓

Cause the electronic message to be sent all electronic message system addresses in the distribution list, excluding the electronic message system address as specified by the special character.  360

```
┌─────────────────────────────────────────────────────────────────────────┐
│ Receive an electronic message system distribution list displayed in a   │
│ header field of an electronic message that is being composed            │
│                                                                     510 │
└─────────────────────────────────────────────────────────────────────────┘
                                    │
                                    ▼
┌─────────────────────────────────────────────────────────────────────────┐
│ Receive a portion of an electronic message system address to be         │
│ excluded from the electronic message system distribution list. The      │
│ portion of the electronic message system address to be excluded can be  │
│ displayed following the electronic message system distribution list in  │
│ the header field of the electronic message that is being composed. The  │
│ portion of the electronic message system address to be excluded can be  │
│ indicated with the use of a wildcard character such as *            520 │
└─────────────────────────────────────────────────────────────────────────┘
                                    │
                                    ▼
┌─────────────────────────────────────────────────────────────────────────┐
│ Compare the portion of the electronic message system address to be      │
│ excluded with each electronic message system address in the email       │
│ distribution list. 530                                                  │
└─────────────────────────────────────────────────────────────────────────┘
```

Does the electronic message system distribution list include electronic message system addresses having the portion of the electronic message system address to be excluded? 540

NO → Do not send the electronic message and report the discrepancy to the user. 550

YES ↓

Remove the electronic message system address having the portion of the electronic message system address to be excluded from the electronic message system distribution list and cause the electronic message to be sent to the remaining electronic message system addresses. 560

MAILING LIST MANIPULATIONS

TECHNICAL FIELD

The present disclosure relates mailing list manipulations, and more specifically to a method and system for manipulating an electronic messaging system distribution list to exclude electronic messaging system addresses from the distribution list.

BACKGROUND

An electronic messaging system, such as electronic mail (email) is a method of exchanging digital messages from an author or sender to one or more recipients. Electronic messaging systems operate across the internet or across private computer networks. A typical electronic messaging system includes an electronic message server, which accepts, forwards, delivers and stores electronic messages. The sender and recipients of the electronic message are not required to be online simultaneously, rather they need to connect briefly to the electronic message server to send or receive the electronic messages.

An electronic message includes a message header which contains control information, including a field for one or more electronic message system addresses of the recipient. An electronic messaging system address identifies an electronic message system recipient to which electronic messages are to be delivered. Common header fields for an electronic message include:

To: the recipients' electronic messaging system addresses.

Cc: carbon copy—additional recipients' electronic messaging system addresses to which the electronic message is to be copied.

Bcc: blind carbon copy—additional recipients' electronic messaging system addresses added that remain invisible to other recipients.

Reply-to: the default address or addresses for replies.

An email address includes a local part, and @ symbol, and a domain part. Examples of an email address include: john.doe@example.net; johndoe@example.com; and jdoe@example.gov. The local part of the email address is used to identify the user of the email address. It is often the user's name or a derivative of the user's name. The @ symbol delineates the local part of the email address from the domain part of the email address. The domain part of the email address is used to identify an email provider organization which can define the target host for the destination of the email.

An electronic messaging system distribution list is a feature of an electronic messaging program that maintains a list of several electronic messaging system addresses and allows an author of an electronic message to send messages to all of the electronic messaging system addresses in the list at one time by including the distribution list in the electronic message header. It would be useful to be able to manipulate the electronic messaging system distribution list.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for providing a mailing list manipulation subsystem are described. In an example, the electronic message manipulation subsystem can receive an electronic messaging system distribution list and an identifier of an electronic messaging system address. The electronic message manipulation subsystem can manipulate determine whether the electronic message system address is also in the distribution list. The electronic message manipulation subsystem can manipulate the distribution list so that the electronic message is sent to each address in the electronic message system distribution list except to the electronic message system address that is associated with the identifier.

Figure 1:
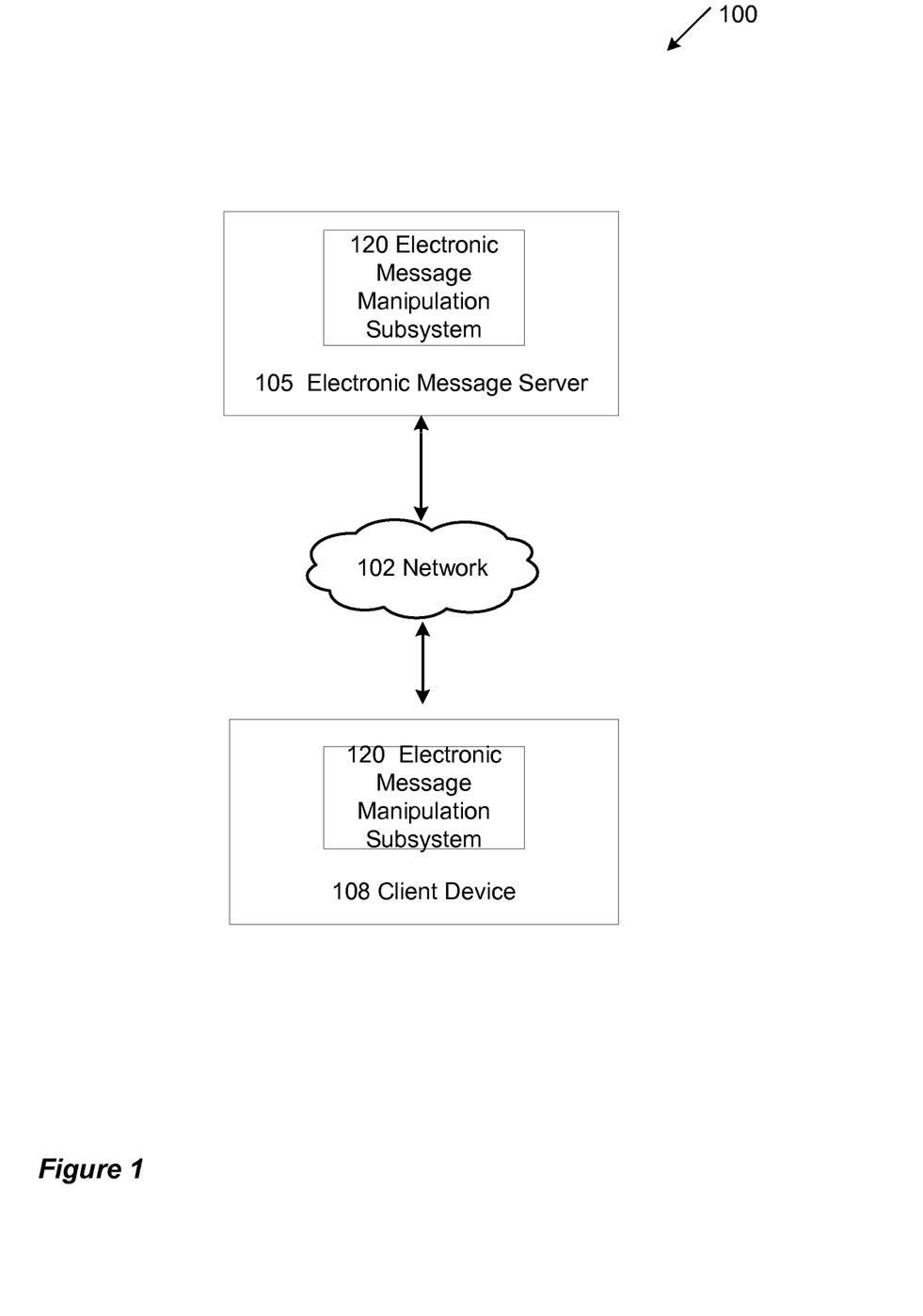
FIG. 1 depicts a block diagram of a network architecture for mailing list manipulations in which implementations of the present disclosure can operate.

FIG. 1 depicts a block diagram of a network architecture 100 for mailing list manipulations in which implementations of the present disclosure can operate. The network architecture 100 includes an electronic message server 105 communicably coupled to a client device 108 via network 102. The network 102 may be a private network (e.g., a local area network (LAN), a wide area network (WAN), intranet, or other similar private networks) or a public network (e.g., the Internet).

The client device 108 can be provided by any type of computing device including server computers, gateway computers, desktop computers, laptop computers, mobile communications devices, cell phones, smart phones, hand-held computers, or similar computing device. In one example, a client device 108 can include an electronic message manipulation subsystem 120 to manipulate an electronic message system distribution list and to communicate with the electronic message server 105. In other examples, the client device 108 can include, but is not limited to, a web interface, web browser, or other client software.

The electronic message server 105 can be a computer that can serve as an electronic post office for electronic messages. Electronic messages can be exchanged via network 102 and other electronic message servers to the destination client device. In an example, the electronic message server 105 can include the electronic message manipulation subsystem 120 to manipulate an electronic message system distribution list and to communicate with the client device 108.

The electronic message server 105 may include one or more machines such as server computers, desktop computers, or any other computing device. The electronic message server 105 can include a server which can be provided by any type of computing device including server computers, gateway computers, desktop computers, laptop computers, hand-held computers or similar computing device. An example computing device is described in greater detail below in conjunction with FIG. 6. The server can provide the electronic message manipulation subsystem 120 to manipulate an electronic message system distribution list.

Figure 2:
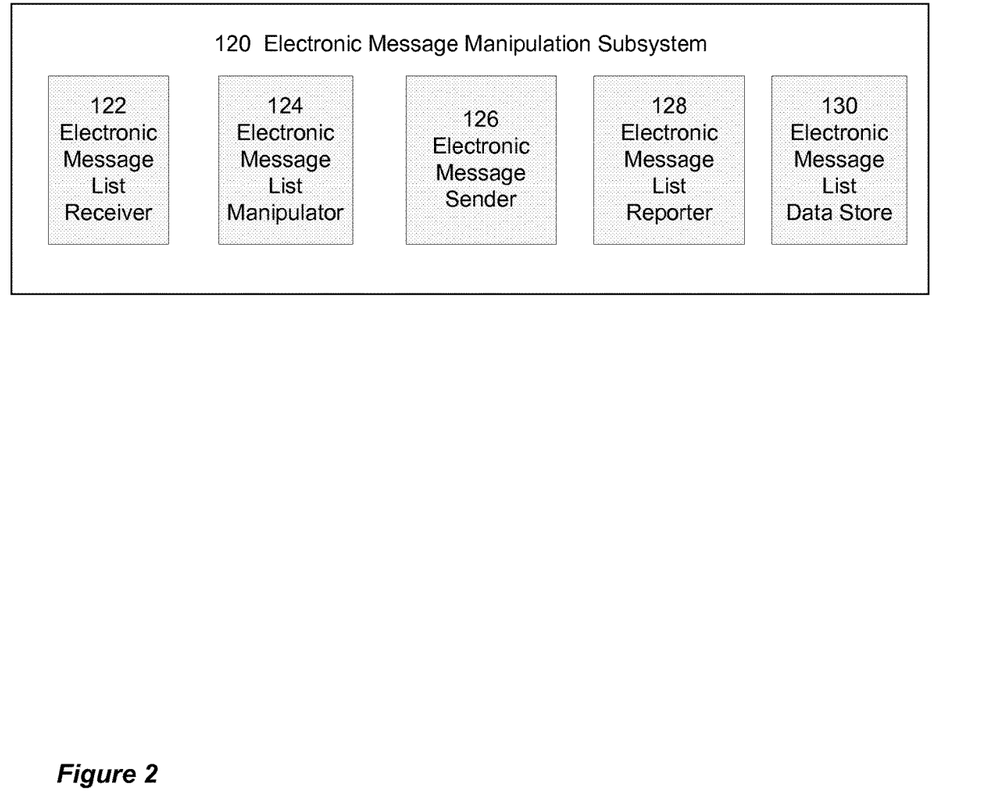
FIG. 2 illustrates a block diagram of an electronic message manipulation subsystem in accordance with some implementations of the present disclosure.

FIG. 2 illustrates a block diagram of the electronic message manipulation subsystem 120 in accordance with some implementations of the present disclosure. In FIG. 2, the electronic message manipulation subsystem 120, of examples of the disclosure, can include the electronic message list receiver 122, the electronic message list manipulator 124, the electronic message sender 126, the electronic message list reporter 128, and the electronic message list data store 130. In one example, the electronic message manipulation subsystem 120 can be a web application provided by a server and accessible via a client device 108. The electronic message manipulation system 120 can be provided on the electronic message server 105 or the client device 108 of FIG. 1.

The electronic message list receiver 122 can receive an electronic message system distribution list and an identifier of an electronic message system address to manipulate the electronic message system distribution list. The electronic message list receiver 122 can receive the electronic message distribution list and an identifier associated with an electronic message address to manipulate the electronic message distribution list from the message header from an electronic message. The electronic message header contains control information, including a field for one or more electronic message addresses for the recipient. Examples of header fields for an electronic message message include: "To:", "Cc", "Bcc", and "Reply-to".

In an example, an electronic message distribution list named "distribution.list" includes, among others, the email address john.doe@example.com. In this example, suppose that the author of the electronic message would like to send an electronic message to every email address in "distribution.list" except for john.doe@example.com. An example may be if the author of the electronic message would like to organize a surprise birthday party for John Doe and wants to send an electronic message to every person in the distribution except for John Doe. In this example, the electronic message list receiver 122 can receive the following instructions from the "To:" list, such as:

To: distribution.list {John_Doe

In this example, the electronic message list receiver 122 can recognize a character, for example, "{" which in this case means to exclude the electronic message address associated with the following identifier from the distribution list. It is noted that the electronic message list manipulator 124 can also receive the electronic message distribution list and the identifier associated with the electronic message address from any header field in the electronic message, such as from the "Cc", "Bcc", and "Reply-to" header fields.

In another example, the electronic message list receiver 122 can recognize a different character, for example, ",", which in this case means to add an additional electronic message distribution list. This could be followed by the "1" character and the identifier, which could then exclude the electronic message address associated with the identifier from both electronic message distribution lists. An example of such instructions can be as follows:

To: first.distribution.list, second.distribution.list {John_Doe

In this example, the electronic message list receiver 122 can recognize that the electronic message address that is associated with the identifier "John_Doe" is to be removed from each of first.distribution.list and second.distribution.list.

In another example, the electronic message list receiver 122 can recognize that the identifier can be a distribution list. In this example, all email addresses that are in the distribution list named "third.distribution.list" can be removed from the first distribution list. An example of such instructions can be as follows:

To: first.distribution.list {third.distribution.list

In this example, the electronic message list receiver 122 can recognize that all email addresses that are associated with the identifier "third.distribution.list" are to be removed from the first.distribution.list.

In another example, the electronic message list receiver 122 can recognize that the identifier can be a distribution list to remove email addresses from more than one distribution list. In this example, all email addresses that are in the distribution list named "third.distribution.list" can be removed from the first and the second distribution lists. An example of such instructions can be as follows:

To: first.distribution.list, second.distribution.list {third.distribution.list

In this example, the electronic message list receiver 122 can recognize that all email addresses that are associated with the identifier "third.distribution.list" are to be removed from the first.distribution.list and also removed from the second.distribution.list.

In another example, the electronic message list receiver 122 can recognize both an identifier and an email address to identify email addresses be removed from the distribution list. In this example, all email addresses that are in the distribution list named "third.distribution.list" plus an identified email address can be removed from the first distribution list. An example of such instructions can be as follows:

To: first.distribution.list {third.distribution.list; john.doe@example.com

In this example, the electronic message list receiver 122 can recognize that all email addresses that are associated with the identifier "third.distribution.list" are to be removed from the first.distribution.list. In addition, the email address "john.doe@example.com" is to be removed from the first.distribution.list.

In another example, the electronic message list receiver 122 can recognize a wildcard character in the identifier. An example of such a wildcard character can be "*". The wildcard character can be used to signify that any character may be substituted within the defined identifier. In this example, all email addresses that begin with a certain letter or sequence of letters can be removed from the first distribution list. An example of such instructions can be as follows:

To: first.distribution.list {j*

In this example, the electronic message list receiver 122 can recognize that all email addresses that begin with the letter "j", such as john.doe@example.com and jane.doe@example.com, are to be removed from the first.distribution.list.

Similarly, consider the following example:

Cc: first.distribution.list {jo*

In this example, the electronic message list receiver 122 can recognize that all email addresses that begin with the character sequence of "jo", such as john.doe@example.com, are to be removed from the first.distribution.list. However, the email address of jane.doe@example.com will not be removed from the first.distribution.list because this email address begins with the character sequence of "ja" and only email addresses that begin with the character sequence of "jo" are to be removed.

In another example involving the use of the wildcard character, the electronic message list receiver 122 can recognize that all email addresses from a certain domain name are to be removed from the first.distribution.list. An example of such instructions can be as follows:

Bcc: first.distribution.list {*@example.com

In this example, the electronic message list receiver 122 can recognize that all email addresses that have the domain name "@example.com" are to be removed from the first.distribution.list.

In another example, the electronic message list receiver 122 can recognize a different character, for example, "+" which in this case means to only send the email to the email address associated with the following identifier. An example of such instructions can be as follows:

To: first.distribution.list+*@example.com

In this example, the electronic message list receiver 122 can recognize that the email is to be sent only to email addresses in first.distribution.list that have the domain name "@example.com". The email will not be sent to any email addresses in first.distribution.list that do not have the domain name "@example.com".

After the electronic message list receiver 122 receives the information from the header fields of the email message as discussed above, the information can be sent to the electronic message list manipulator 124 for processing. The electronic message list manipulator 124 can receive the instructions from the electronic message list receiver 122 and can temporarily edit the distribution list as per instructions from the header field. For example, the electronic message list manipulator 124 can remove the email addresses from the distribution list as instructed by the operational characters and indicators in the header field, upon which the email and the manipulated distribution list can be forwarded to the electronic message sender 126 to cause the electronic message to be sent to the identified recipients.

The electronic message manipulation subsystem 120 can include an electronic message list reporter 128 to report activities to the client device 108. For example, the electronic message list reporter 128 can inform the client device 108 of any discrepancies prior to forwarding the email and the manipulated distribution list to the electronic message sender 126. Examples of discrepancies can occur when, for example, the email addresses associated with the identifier are not in the distribution list. In an example, suppose the email message header indicates the following instructions:

To: distribution.list {John_Doe

Further suppose that the identifier "John_Doe" is associated with the email address john.doe@example.com, which does not exist in distribution.list. In an example, prior to causing the electronic message to be sent to the email addresses in distribution.list, the electronic message list reporter 128 can send a message to the client device 108 indicating that the email address that is associated with the identifier does not exist in the distribution list. This can give the user of the client device 108 a chance to correct a possible mistake in the instructions in the header information.

The electronic message manipulation subsystem 120 can store email distribution lists, emails, and email data in a data repository or an email list data store 130 that can be coupled to the electronic message server 105. The data store 130 may be part of the electronic message manipulation subsystem 120 or may be coupled to the electronic message manipulation subsystem 120 directly or via the network 102. The data store 130 can be a persistent storage unit that stores product subscriptions and their associated rules. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A "set," as used herein, refers to any positive whole number of items.

Figure 3:
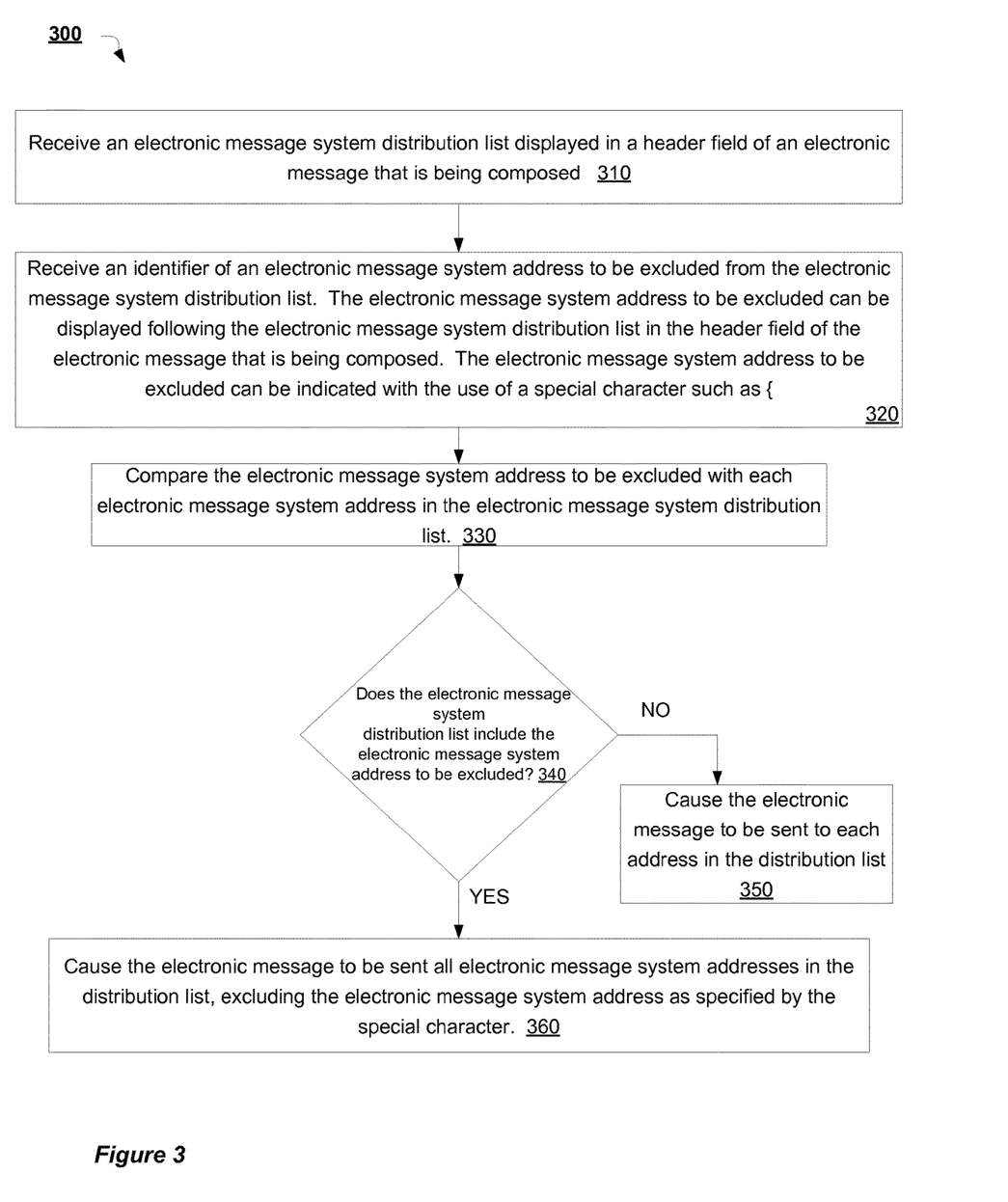
FIG. 3 shows a flow diagram illustrating an example for mailing list manipulations in accordance with some implementations of the present disclosure.

FIG. 3 shows a flow diagram illustrating an example for mailing list manipulations in accordance with some implementations of the present disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the electronic message manipulation subsystem 120 described with respect to FIG. 1.

Referring to FIG. 3, the method 300 begins at block 310, where the electronic message manipulation subsystem 120 receives an electronic message distribution list displayed in a header field of an email that is being composed. At block 320, the electronic message manipulation subsystem 120 receives an email address to be excluded from the email distribution list. The email address to be excluded can be displayed following the email distribution list in the header field of the email that is being composed. The email address to be excluded can be indicated with the use of a special character such as "{". At block 330, the electronic message manipulation subsystem 120 compares the displayed email address to be excluded with each email address in the email distribution list.

At block 340, the electronic message manipulation subsystem 120 determines whether the email distribution list includes the email address to be excluded. If the email distribution list does not include the email address to be excluded, then at block 350 the electronic message manipulation subsystem 120 causes the electronic message or email to be sent to each address in the distribution list and the method 300 ends.

At block 340, if the email distribution list includes the email address to be excluded, then at block 360 the electronic message manipulation subsystem 120 causes the email to be sent to each address in the distribution list excluding the email address as indicated by the special character and the method 300 ends.

Figure 4:
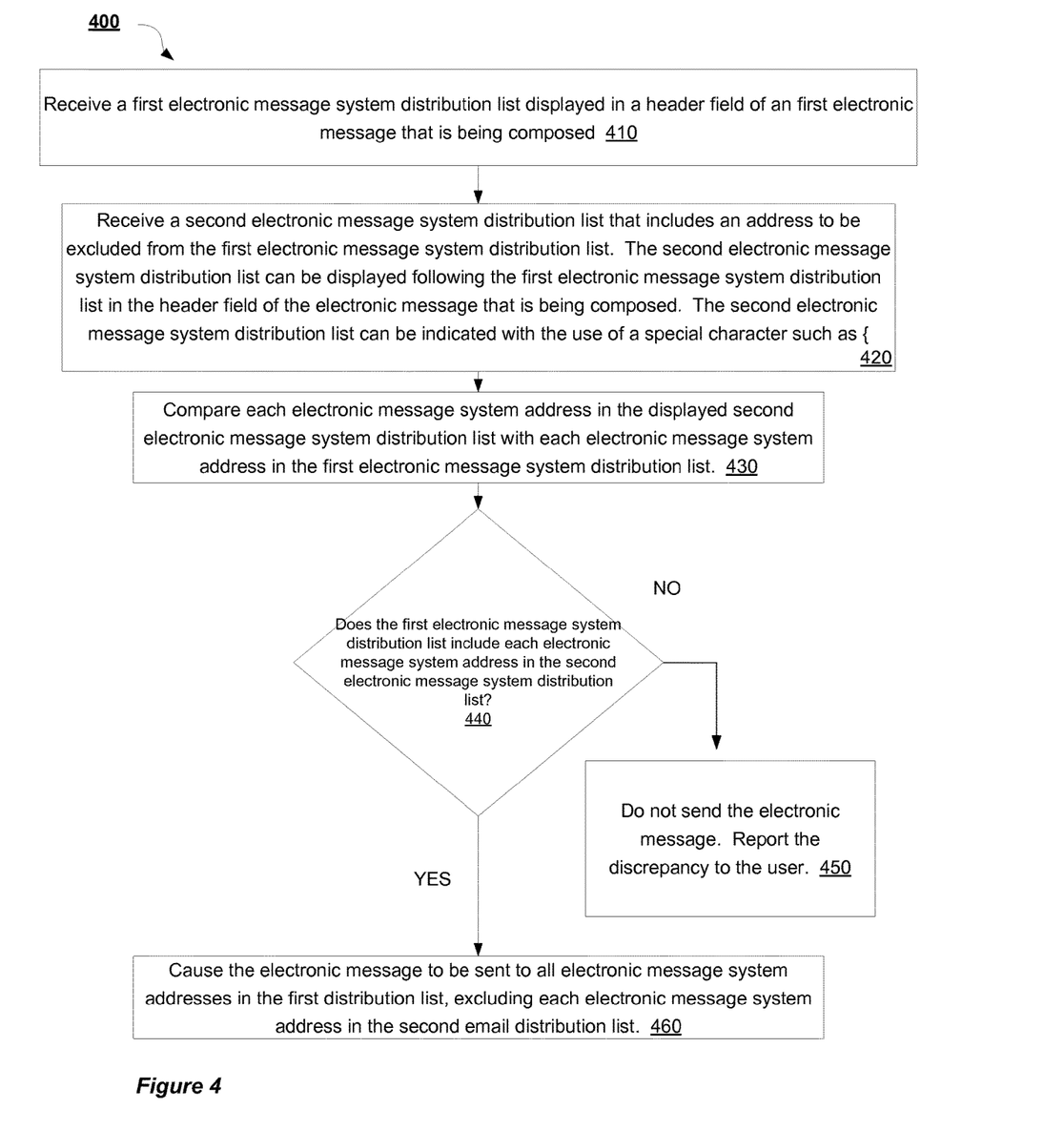
FIG. 4 shows a flow diagram illustrating an example for mailing list manipulations in accordance with some implementations of the present disclosure.

FIG. 4 shows a flow diagram illustrating an example for mailing list manipulations in accordance with some implementations of the present disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by the electronic message manipulation subsystem 120 described with respect to FIG. 1.

Referring to FIG. 4, the method 400 begins at block 410, where the electronic message manipulation subsystem 120 receives a first electronic message system distribution list displayed in a header field of an electronic message that is being composed. At block 420, the electronic message manipulation subsystem 120 receives a second electronic message system distribution list that includes address to be excluded from the first electronic message system distribution list. The second electronic message system distribution list can be displayed following the first electronic message system distribution list in the header field of the electronic message that is being composed. The second electronic message system distribution list can be indicated with the use of a special character such as "{". At block 430, the electronic message manipulation subsystem 120 compares each electronic message system address in the displayed second electronic message system distribution list with each electronic message system address in the first electronic message system distribution list.

At block 440, the electronic message manipulation subsystem 120 determines whether the first electronic message system distribution list includes each electronic message system address in the second electronic message system distribution list. If the first electronic message system distribution list does not include teach electronic message system address in the second electronic message system distribution list, then at block 450 the electronic message manipulation subsystem 120 does not send the electronic message, reports this discrepancy to the user, and the method 400 ends.

At block 440, if the first electronic message system distribution list includes each electronic message system address in the second electronic message system distribution list, then at block 460 the electronic message manipulation subsystem 120 sends the electronic message to all electronic message system addresses in the first distribution list, excluding each electronic message system address in the second electronic message system distribution list, and the method 400 ends.

Figure 5:
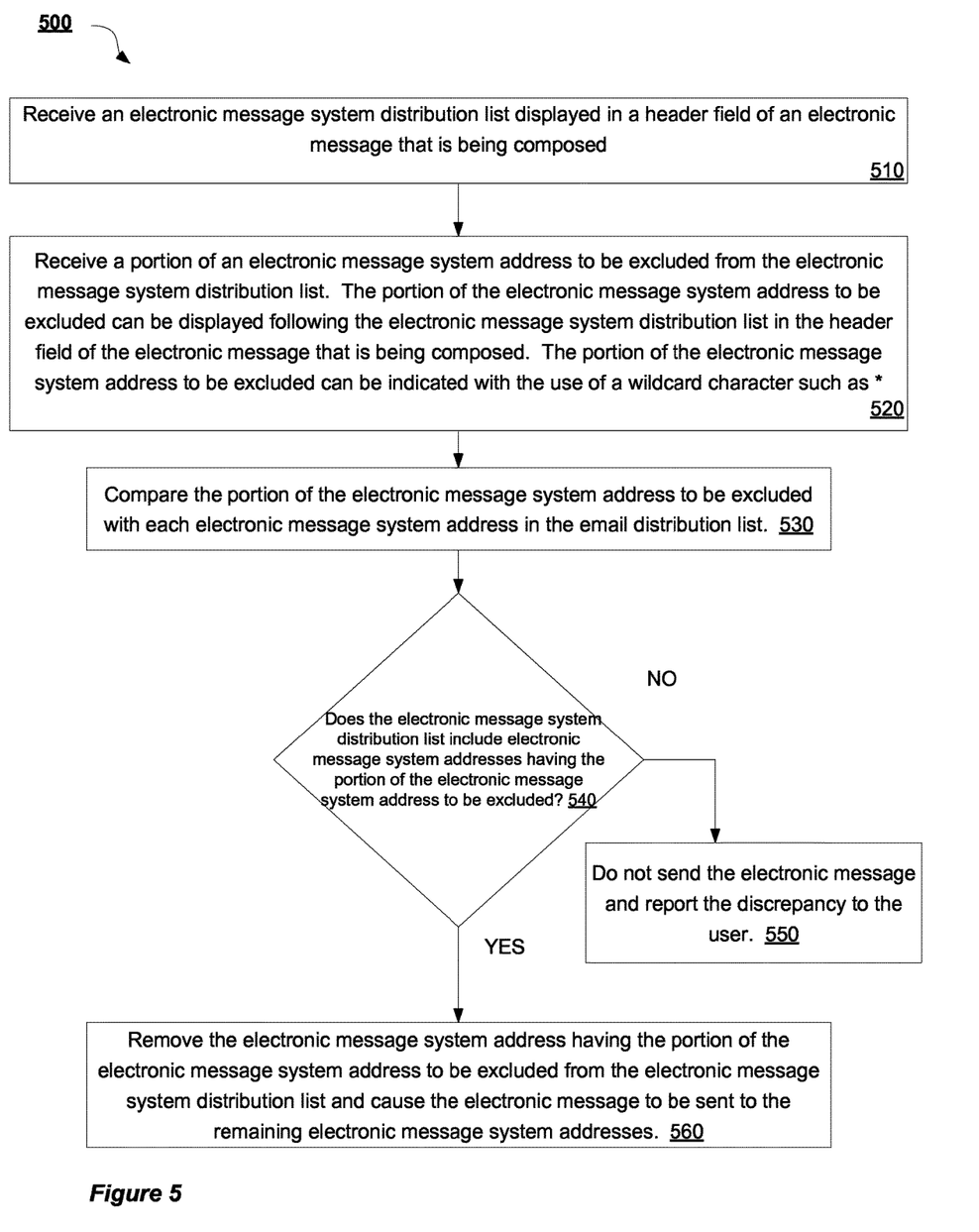
FIG. 5 shows a flow diagram illustrating an example for mailing list manipulations in accordance with some implementations of the present disclosure.

FIG. 5 shows a flow diagram illustrating an example for mailing list manipulations in accordance with some implementations of the present disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by the electronic message manipulation subsystem 120 described with respect to FIG. 1.

Referring to FIG. 5, the method 500 begins at block 510, where the electronic message manipulation subsystem 120 receives an electronic message system distribution list displayed in a header field of an electronic message that is being composed. At block 520, the electronic message manipulation subsystem 120 receives a portion of an electronic message system address to be excluded from the electronic message system distribution list. The portion of the electronic message system address to be excluded can be displayed following the electronic message system distribution list in the header field of the electronic message that is being composed. The portion of the electronic message system address to be excluded can be indicated with the use of a wildcard character such as "*". At block 530, the electronic message manipulation subsystem 120 compares the portion of the electronic message system address to be excluded with each electronic message system address in the electronic message system distribution list.

At block 540, if the electronic message system distribution list does not include electronic message system addresses having the portion of the electronic message system address to be excluded, then at block 550 the electronic message manipulation subsystem 120 does not send the electronic message, reports the discrepancy to the user, and the method 500 ends.

At block 540, if the electronic message system distribution list includes electronic message system addresses having the portion of the electronic message system address to be excluded, then at block 560 the electronic message manipulation subsystem 120 removes the electronic message system address having the portion of the electronic message system address to be excluded from the electronic message system distribution list, sends the electronic message to the remaining electronic message system addresses, and the method 500 ends.

Figure 6:
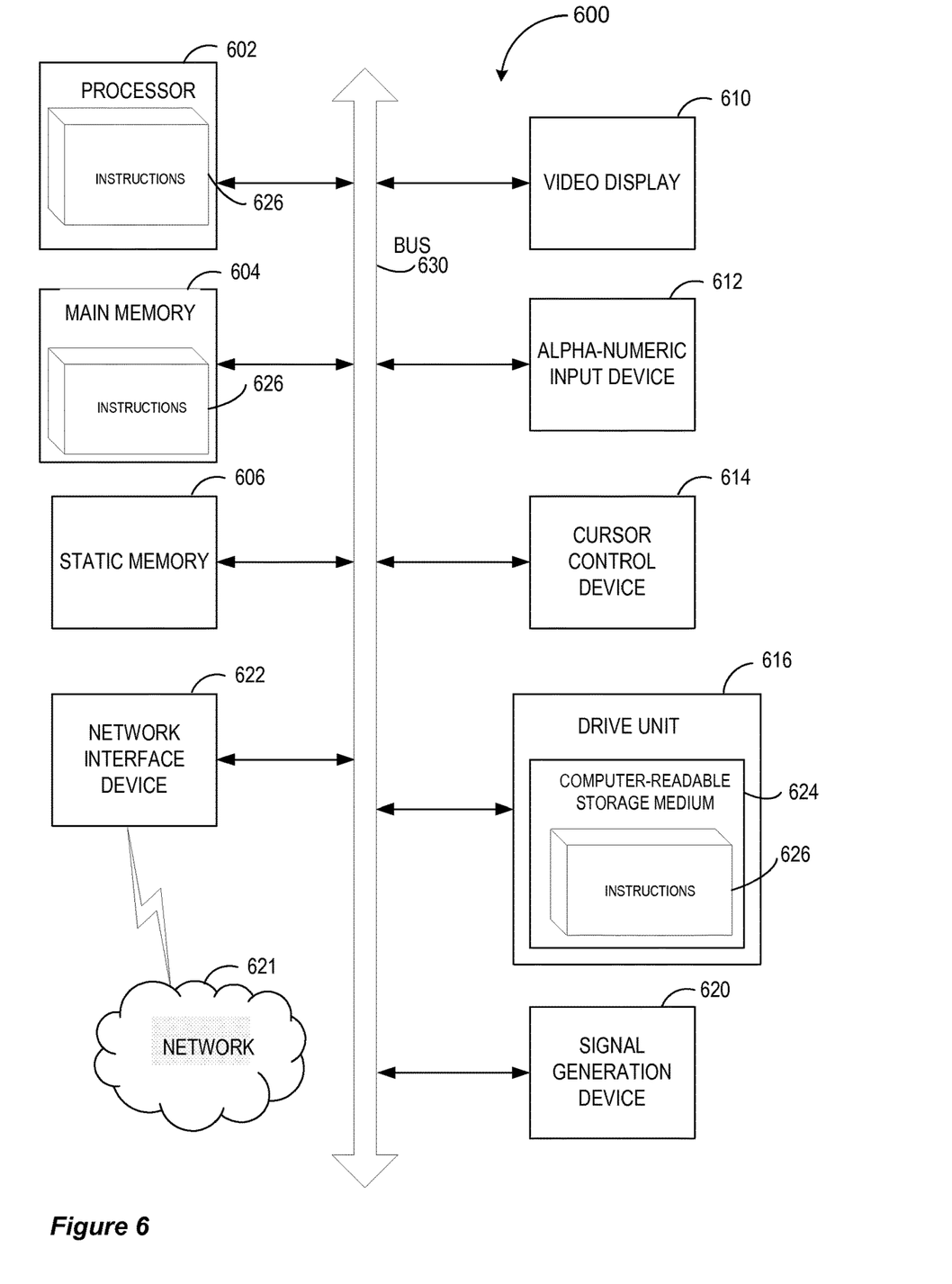
FIG. 6 shows a diagrammatic representation of a machine in the form of a computer system, in accordance with one example.

FIG. 6 depicts a diagrammatic representation of a machine in the form of a computer system 600 within which a set of memory instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602 (e.g., a processor), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the operations for the electronic message manipulation subsystem 120 for performing steps discussed herein.

The computer system 600 may further include a network interface device 622. The network interface device may be in communication with a network 102. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the electronic message manipulation subsystem 120) for the computer system 600 representing any one or more of the methodologies or functions described herein. The instructions 626 for the computer system 600 may also reside, completely or at least partially, within the main memory 604 and/or within the processing device 602 during execution thereof by the computer system 600, the main memory 604 and the processing device 602 also constituting computer-readable storage media. The instructions 626 for the computer system 600 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   temporarily editing a first distribution list by:
      receiving, by a processing device, the first distribution list comprising a first plurality of electronic messaging system addresses, the first distribution list being an electronic messaging system distribution list;
      receiving a first character, a first identifier comprising a wildcard character, and a character sequence to identify electronic messaging system addresses, wherein the wildcard character indicates the character sequence as search criteria, and wherein the first character identifies a first operation to be performed on the first distribution list in view of the character sequence;
      in response to receiving the first character:
         comparing the first identifier with each of the first plurality of electronic messaging system addresses to identify one or more electronic messaging system addresses that comprise the character sequence in the corresponding local part; and
         causing, by the processing device, an electronic message to be sent via an electronic message server to one or more of the first plurality of electronic messaging system addresses in the first distribution list that comprise the character sequence;
      receiving a second character and a second identifier indicating a second distribution list comprising a second plurality of electronic messaging system addresses, wherein the second character identifies a second operation to be performed on the first distribution list in view of the second distribution list;
      in response to receiving the second character:
         comparing each electronic messaging system address in the second distribution list to each electronic messaging system address in the first distribution list to determine whether the second plurality of electronic messaging system addresses is a subset of the first plurality of electronic messaging system addresses;

causing, by the processing device, a second electronic message to be sent via the electronic message server to the first plurality of electronic messaging system addresses except to the second plurality of electronic messaging system addresses in response to determining that the second plurality of electronic messaging system addresses is a subset of the first plurality of electronic messaging system addresses; and in response to determining that one or more of the second plurality of electronic messaging system addresses are not within the first plurality of electronic messaging system addresses:

refraining, by the processing device, from sending the second electronic message; and indicating that the one or more of the second plurality of electronic messaging system addresses are not within the first plurality of electronic messaging system addresses and indicating that the second distribution list may be modified.

2. The method of claim 1, further comprising detecting the first identifier using a pre-defined character pattern.

3. The method of claim 2, further comprising receiving a first electronic messaging system address that identifies a third distribution list comprising a third plurality of electronic messaging system addresses, wherein the one or more of the first plurality of electronic messaging system addresses in the first distribution list further do not include the third plurality of electronic messaging system addresses in the third distribution list.

4. The method of claim 3, further comprising receiving a third identifier referencing a second electronic messaging system address, wherein the one or more of the first plurality of electronic messaging system addresses in the first distribution list further do not include the third electronic messaging system address.

5. The method of claim 1, wherein the method is provided via an electronic messaging system that is an email system.

6. A system comprising:
a memory device; and
a processing device communicably coupled to the memory device, wherein the processing device is to:
temporarily edit a first distribution list, wherein to temporarily edit the first distribution list, the processing device is further configured to:
receive the first distribution list comprising a first plurality of electronic messaging system addresses, the first distribution list being an electronic messaging system distribution list;
receive a first character, a first identifier comprising a wildcard character and a character sequence to identify electronic messaging system addresses, wherein the wildcard character indicates the character sequence as search criteria, and wherein the first character identifies a first operation to be performed on the first distribution list in view of the character sequence;
in response to receiving the first character:
compare the first identifier with each of the first plurality of electronic messaging system addresses to identify one or more electronic messaging system addresses that comprise the character sequence in the corresponding local part; and cause an electronic message to be sent via an electronic message server to each of the first plurality of electronic messaging system addresses in the first distribution list that comprise the character sequence;

receive a second character and a second identifier indicating a second distribution list comprising a second plurality of electronic messaging system addresses, wherein the second character identifies a second operation to be performed on the first distribution list in view of the second distribution list;

in response to receiving the second character:
compare each electronic messaging system address in the second distribution list to each electronic messaging system address in the first distribution list to determine whether the second plurality of electronic messaging system addresses is a subset of the first plurality of electronic messaging system addresses;

cause, by the processing device, a second electronic message to be sent via the electronic message server to the first plurality of electronic messaging system addresses except to the second plurality of electronic messaging system addresses in response to determining that the second plurality of electronic messaging system addresses is a subset of the first plurality of electronic messaging system addresses;

in response to determining that one or more of the second plurality of electronic messaging system addresses are not within the first plurality of electronic messaging system addresses:

refrain, by the processing device, from sending the second electronic message; and indicate that the one or more of the second plurality of electronic messaging system addresses are not within the first plurality of electronic messaging system addresses and indicate that the second distribution list may be modified.

7. The system of claim 6, wherein the processing device is further to detect the first identifier using a pre-defined character pattern.

8. The system of claim 7, wherein the processing device is further to receive a first electronic messaging system address that identifies a third distribution list comprising a third plurality of electronic messaging system addresses, wherein the one or more of the first plurality of electronic messaging system addresses in the first distribution list further do not include the third plurality of electronic messaging system addresses in the third distribution list.

9. The system of claim 8, wherein the processing device is further to receive a third identifier referencing a second electronic messaging system address, wherein the one or more of the first plurality of electronic messaging system addresses in the first distribution list further do not include the third electronic messaging system address.

10. A non-transitory machine-readable storage medium including instructions that, when accessed by a processing device, cause the processing device to:
temporarily edit a first distribution list, wherein to temporarily edit the first distribution list, the instructions further cause the processing device to:
receive, by the processing device, the first distribution list comprising a first plurality of electronic messaging system addresses, the first distribution list being an electronic messaging system distribution list;
receive a first character, a first identifier comprising a wildcard character and a character sequence to identify electronic messaging system addresses, wherein the wildcard character indicates the character sequence as search criteria, and wherein the first character identifies a first operation to be performed on the first distribution list in view of the character sequence;
in response to receiving the first character:
compare the first identifier with the each of the first plurality of electronic messaging system addresses to identify one or more electronic messaging system addresses that comprise the character sequence in the corresponding local part; and
cause, by the processing device, an electronic message to be sent via an electronic message server to one or more of the first plurality of electronic messaging system addresses in the first distribution list that comprise the character sequence;
receive a second character and a second identifier indicating a second distribution list comprising a second plurality of electronic messaging system addresses, wherein the second character identifies a second operation to be performed on the first distribution list in view of the second distribution list;
in response to receiving the second character:
compare each electronic messaging system address in the second distribution list to each electronic messaging system address in the first distribution list to determine whether the second plurality of electronic messaging system addresses is a subset of the first plurality of electronic messaging system addresses;
cause, by the processing device, a second electronic message to be sent via the electronic message server to the first plurality of electronic messaging system addresses except to the second plurality of electronic messaging system addresses in response to determining that the second plurality of electronic messaging system addresses is a subset of the first plurality of electronic messaging system addresses;
in response to determining that one or more of the second plurality of electronic messaging system addresses are not within the first plurality of electronic messaging system addresses:
refrain, by the processing device, from sending the second electronic message; and
indicate that the one or more of the second plurality of electronic messaging system addresses are not within the first plurality of electronic messaging system addresses and indicate that the second distribution list may be modified.

11. The non-transitory machine-readable storage medium of claim 10, processing device further to detect the first identifier using a pre-defined character pattern.

12. The non-transitory machine-readable storage medium of claim 11, the processing device further to receive a first electronic messaging system address that identifies a third distribution list comprising a third plurality of electronic messaging system addresses, wherein the one or more of the first plurality of the electronic messaging system addresses in the first distribution list further do not include the third plurality of electronic messaging system addresses in the third distribution list.

13. The non-transitory machine-readable storage medium of claim 12, wherein the processing device is further to receive a third identifier referencing a second electronic messaging system address, wherein the one or more of the first plurality of electronic messaging system addresses in the first distribution list further do not include the third electronic messaging system address.

* * * * *